UNITED STATES PATENT OFFICE.

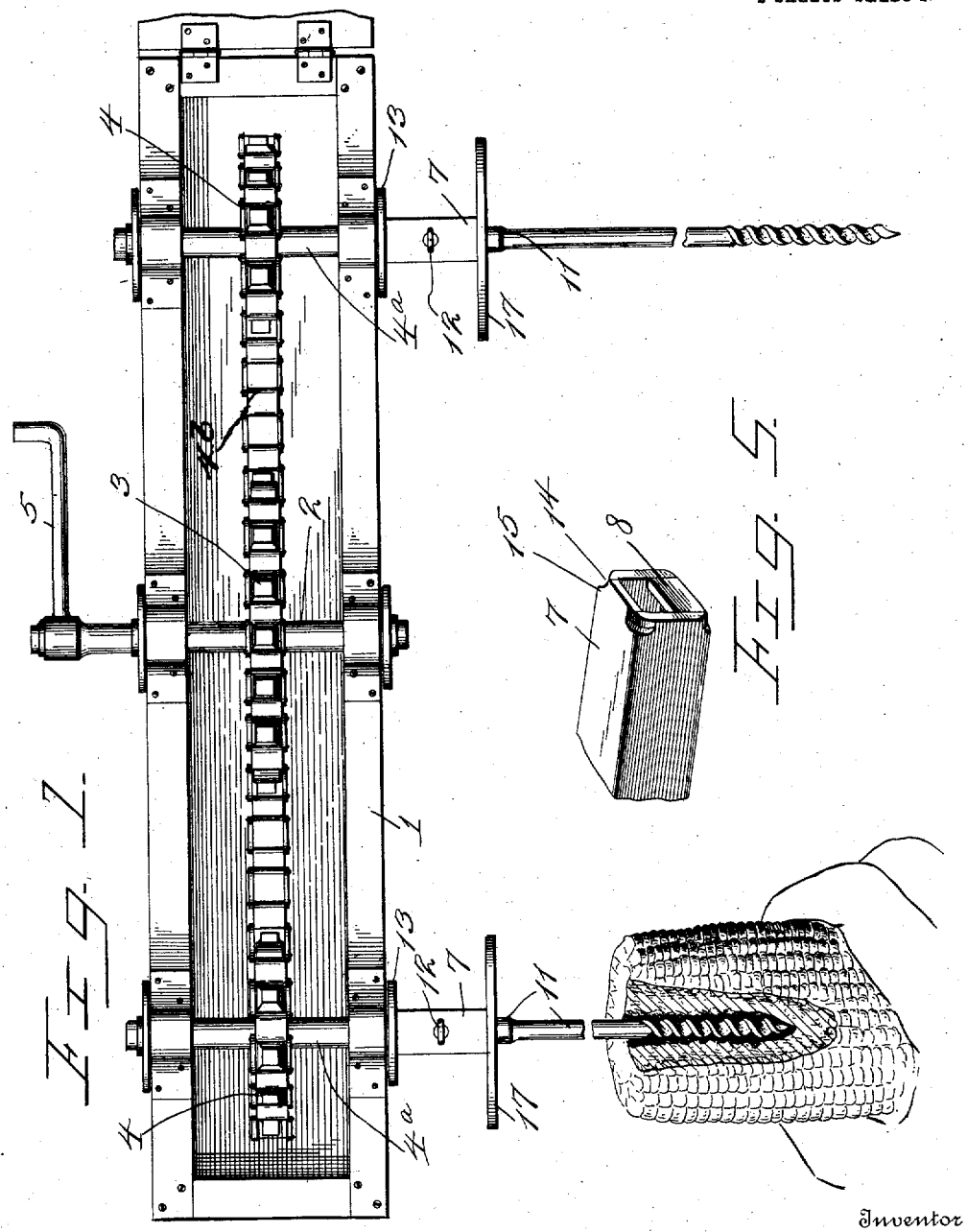

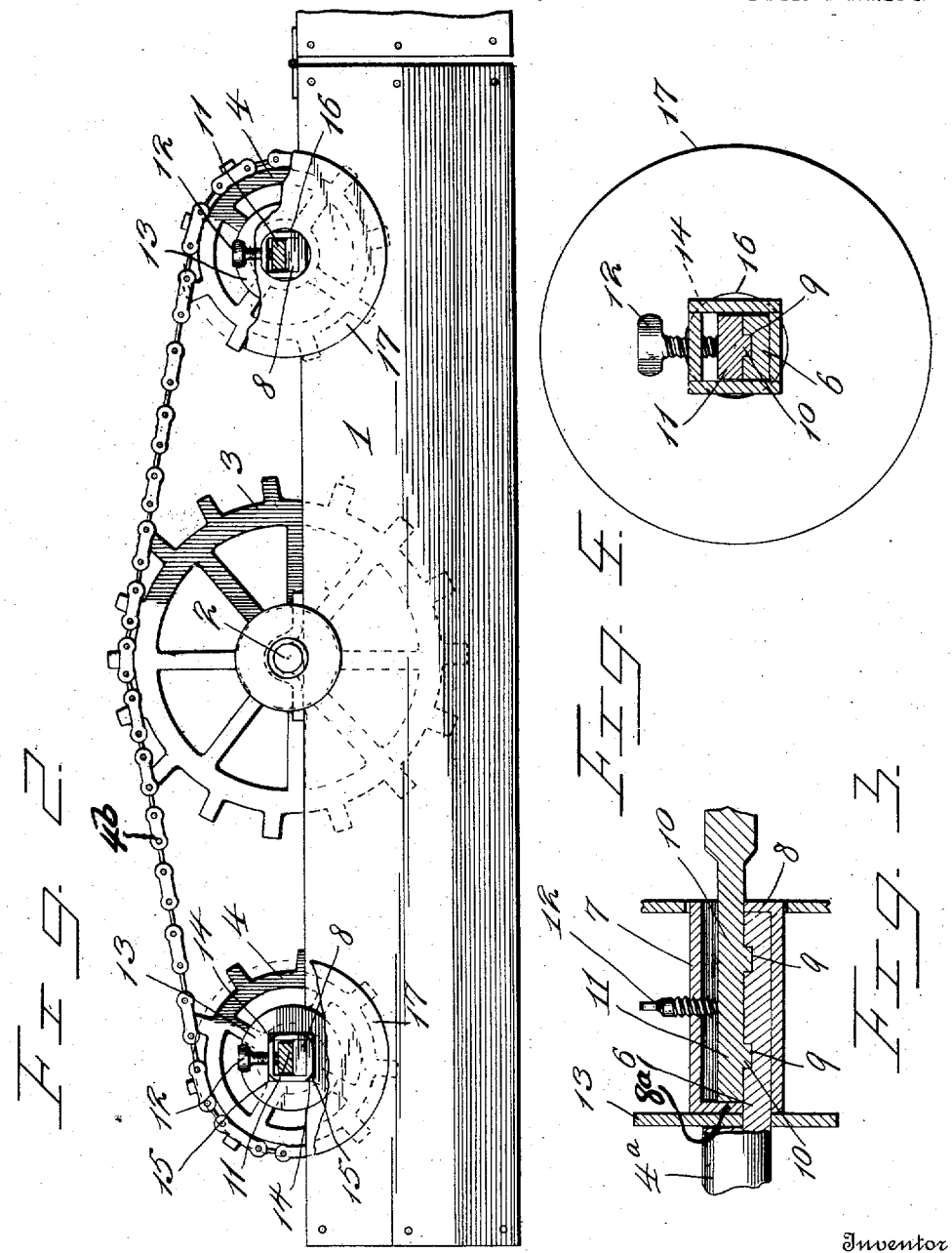

CHRISTIAN NAVE, OF MARNE, IOWA.

PITH-BORING DEVICE.

987,314.  Specification of Letters Patent.  Patented Mar. 21, 1911.

Application filed November 5, 1910. Serial No. 590,928.

*To all whom it may concern:*

Be it known that I, CHRISTIAN NAVE, a citizen of the United States, residing at Marne, in the county of Cass and State of Iowa, have invented a new and useful Pith-Boring Device; and I do hereby declare the following to be a full, clear, and exact description of the invention, such as will enable others skilled in the art to which it appertains to make and use the same.

The invention relates to a corn pither and has for its object to provide a device of this character adapted to remove the pith from ears of corn in a quick and effective manner.

One of the objects of the invention is to provide a device of this character which can be compactly closed within a box, and which can supply the necessary mechanism for removing the pith from one or more ears of corn at the same time.

The further object of the invention is to provide a device of this character having novel means for supporting a bit in a horizontal position.

With these and other objects in view, the invention consists in the novel construction and arrangement of parts hereinafter described and shown and particularly pointed out in the appended claims.

In the drawings:—Figure 1 is a plan view of a corn pither constructed in accordance with this invention. Fig. 2 is a side elevation. Fig. 3 is a longitudinal sectional view through one of the casings for holding the bit. Fig. 4 is a vertical sectional view taken transversely of Fig. 3. Fig. 5 is a perspective view of the bit holding member.

It is customary among farmers to select the best corn for seed for the crop of the following year. In order to produce the best results, it is desirable to remove the pith from the corn cob, so that the corn on the cob may be more thoroughly and effectively cured, thereby producing the best and most productive seed. The old fashioned way of removing the pith by hand is very slow and tedious. My invention for performing this work consists of a longitudinal frame 1 in which a shaft 2 is mounted which is provided with a sprocket wheel 3. Also arranged in the frame 1 are the sprocket wheels 4, similar to wheel 3. These wheels are engaged by a sprocket chain 4$^b$. The shaft 2 is also provided with a crank handle 5, which when it operates the wheel 3 also actuates the other wheels 4, as will be readily understood. The sprocket wheels 4 are mounted on the shafts 4$^a$, which are provided with extensions 6, which are fitted in the rectangular casings 7. The casings 7 are provided with upward projections 8, which serve as stops for the extensions 6. The extensions 6 are also provided with recesses 9, which are engaged by lugs 10 formed integrally with the bit heads 11. The casings are provided with downwardly extending projections 8$^a$, which constitute means to prevent outward movements of the casings.

When the bit heads and the extensions 6 are inserted in the casings 7, the same are held against displacement by thumb screws 12, which hold the two parts 6 and 11 together.

Between the frame 1 and the casings 7 are washers 13. The outer ends of the casings 7 are provided with recessed portions 14, forming shoulders 15. The recessed portions 14 extend through the circular openings 16 of the disks 17. The disks are designed for the purpose of preventing the ears of corn from abutting against the casings when the pith shall have been completely removed. The disks 17 are held in position by frictional engagement with the recessed portions 14.

It will be seen that my invention is simple, inexpensive, and durable, and that the same is adapted to readily extract the pith from ears of corn in a very simple and efficient manner.

Having thus described the invention, what I claim is:—

1. In a pith boring device, a pair of rotating shafts, and means for rotating the shafts, said shafts having extensions rectangular in cross section and provided with recesses; bit holding casings each provided with inwardly extending projections fitted on said extensions; bits having extensions provided with lugs to engage the recesses of the extensions of the shafts, the extensions of the bits being arranged in the casings and in contact with the lugs of the casings, thus constituting means to prevent outward movement of the casings; and threaded members penetrating the casings to engage the extensions of the bits, so as to hold the lugs thereof in engagement with the recesses of the extensions of the shafts.

2. In a pith boring device, a pair of shafts, and means for rotating the shafts, a pair of bits, coupling devices for connecting the bits and the shafts to cause them to rotate together, said coupling devices having casings, rectangular in cross section, said casings having their corners, at the outer ends provided with recesses, and disks having circular openings received on the outer ends of the casings by the said recesses, the disks being of diameters sufficient to prevent injury of the cobs by their contact with the casings.

In testimony whereof I have signed my name to this specification in the presence of two subscribing witnesses.

CHRISTIAN NAVE.

Witnesses:
DICK TOLLENAUR,
W. MATHIES.

Copies of this patent may be obtained for five cents each, by addressing the "Commissioner of Patents, Washington, D. C."